US007339789B2

(12) United States Patent
Walters et al.

(10) Patent No.: US 7,339,789 B2
(45) Date of Patent: Mar. 4, 2008

(54) MODULAR, SCALABLE THERMAL SOLUTION

(75) Inventors: Joseph Douglass Walters, San Jose, CA (US); Zoran Stefanoski, Menlo Park, CA (US); Tommy C. Lee, Danville, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/565,559

(22) Filed: Nov. 30, 2006

(65) Prior Publication Data

US 2007/0097641 A1 May 3, 2007

Related U.S. Application Data

(60) Continuation-in-part of application No. 10/822,958, filed on Apr. 12, 2004, and a division of application No. 10/917,137, filed on Aug. 12, 2004, now Pat. No. 7,151,667.

(51) Int. Cl.
 *H05K 7/20* (2006.01)
(52) U.S. Cl. .................. 361/699; 361/694; 361/695; 361/696; 361/697; 165/80.3; 165/80.4; 174/15.1
(58) Field of Classification Search .................. None
 See application file for complete search history.

(56) References Cited

U.S. PATENT DOCUMENTS

| | | | | |
|---|---|---|---|---|
| 5,285,347 A | * | 2/1994 | Fox et al. .................. | 361/699 |
| 5,323,847 A | * | 6/1994 | Koizumi et al. ........ | 165/104.33 |
| 5,365,749 A | * | 11/1994 | Porter ........................ | 62/259.2 |
| 5,509,468 A | * | 4/1996 | Lopez ........................ | 165/144 |
| 5,731,954 A | * | 3/1998 | Cheon ........................ | 361/699 |
| 6,166,907 A | * | 12/2000 | Chien ........................ | 361/699 |
| 6,170,563 B1 | | 1/2001 | Hsieh | |
| 6,234,240 B1 | * | 5/2001 | Cheon ........................ | 165/80.3 |
| 6,333,852 B1 | | 12/2001 | Lin | |
| 6,343,478 B1 | * | 2/2002 | Chang ........................ | 62/259.2 |
| 6,442,024 B1 | | 8/2002 | Shih | |
| 6,452,797 B1 | | 9/2002 | Konstad | |
| 6,587,343 B2 | | 7/2003 | Novotny et al. | |
| 6,671,177 B1 | | 12/2003 | Han | |
| 6,760,222 B1 | * | 7/2004 | Wang ........................ | 361/700 |
| 6,926,070 B2 | * | 8/2005 | Jenkins et al. ............. | 165/79 |
| 6,958,910 B2 | | 10/2005 | Tanaka et al. | |
| 6,970,355 B2 | * | 11/2005 | Ellsworth et al. ........... | 361/694 |
| 7,002,797 B1 | | 2/2006 | Wittig | |
| 7,012,807 B2 | * | 3/2006 | Chu et al. ................... | 361/699 |
| 7,050,299 B2 | * | 5/2006 | Kondo et al. ............... | 361/689 |

(Continued)

FOREIGN PATENT DOCUMENTS

DE  202 12 754 U1  11/2002

(Continued)

*Primary Examiner*—Boris Chervinsky
(74) *Attorney, Agent, or Firm*—Patterson & Sheridan, LLP

(57) ABSTRACT

One embodiment of a modular, scalable cooling system includes a core cooling module configured to be thermally coupled to a heat-generating electronic device and a supplemental cooling module configured to be thermally coupled to the core cooling module. A first interface attached to the core cooling module is configured to thermally couple the core cooling module to the supplemental cooling module. The core cooling module and the supplemental cooling module may be used alone or in combination to dissipate heat from the heat-generating electronic device.

15 Claims, 10 Drawing Sheets

U.S. PATENT DOCUMENTS

| | | |
|---|---|---|
| 7,151,667 B2 | 12/2006 | Walters et al. |
| 2003/0128514 A1 | 7/2003 | Inoue |
| 2005/0243516 A1 | 11/2005 | Stefanoski et al. |

FOREIGN PATENT DOCUMENTS

| | | |
|---|---|---|
| EP | 0 542 478 A1 | 5/1993 |
| WO | WO 02/102124 A2 | 12/2002 |

* cited by examiner

MODULAR, SCALABLE THERMAL SOLUTION

CROSS-REFERENCE TO RELATED APPLICATIONS

This application is a continuation-in-part of co-pending U.S. patent application Ser. No. 10/822,958, filed Apr. 12, 2004, which is herein incorporated by reference. This application is also a divisional application of U.S. patent application Ser. No. 10/917,137, filed Aug. 12, 2004, now U.S. Pat. No. 7,151,667 which is incorporated herein by reference.

BACKGROUND OF THE INVENTION

1. Field of the Invention

This invention relates generally to computer hardware and more particularly to a modular, scalable thermal solution for computer hardware.

2. Description of the Related Art

FIG. 1 is an isometric view illustrating a prior art cooling system 100 used, for example, to cool electronic devices (e.g., a processor). As shown, cooling system 100 characteristically includes a heat sink assembly 104, which further includes a fan 106, walls 109 and a bottom plate 111. Typically, cooling system 100 is thermally coupled to an electronic device, for example using thermal adhesive having thermal properties that facilitate transferring heat generated by the electronic device to bottom plate 111 of heat sink assembly 104. Cooling system 100 may also include a heat sink lid (not shown), which, among other things, prevents particles and other contaminants from entering fan 106 and air blown from fan 106 from escaping cooling system 100. Heat sink lid 102, together with walls 109 and bottom plate 111 of heat sink assembly 104, define a plurality of air channels 108.

Fan 106 is configured to force air through air channels 108 such that the heat generated by the electronic device transfers to the air as the air passes over bottom plate 111. The heated air then exits heat sink assembly 104, as depicted by flow lines 114, thereby dissipating the heat generated by the electronic device into the external environment. This process cools the electronic device and, among other things, prevents the electronic device from burning up during operation. Persons skilled in the art will understand that air channels 108 typically are configured to direct air blown from fan 106, over bottom plate 111 and walls 109, to the external environment in a manner that most efficiently removes heat from the electronic device.

Cooling systems such as cooling system 100 are typically stand-alone components used in computing systems to maintain the temperatures of various electronic devices within certain specified ranges. Sometimes, the heat generated by an electronic device may increase after a cooling system design is fixed or implemented. For example, in the case of a processor, the average processing level at which the processor operates may increase if the primary use of the computing system changes from a low processing level application (such as word processing) to a high processing level application (such as playing video games). The increase in average processing level may cause the processor to generate more heat. Also, in the case where a processor is upgraded, the new, more powerful processor may generate more heat than the original processor. In such situations, if the existing cooling system does not have the capacity to counter the increased levels of generated heat, then the cooling system may have to be replaced. Replacing an entire cooling system is both time consuming and costly.

Thus, there is a need in the art for a modular, scalable thermal solution for computing systems.

SUMMARY OF THE INVENTION

One embodiment of a modular, scalable cooling system includes a core cooling module configured to be thermally coupled to a heat-generating electronic device and a supplemental cooling module configured to be thermally coupled to the core cooling module. A first interface attached to the core cooling module is configured to thermally couple the core cooling module to the supplemental cooling module. The core cooling module and the supplemental cooling module may be used alone or in combination to dissipate heat from the heat-generating electronic device.

One advantage of the disclosed cooling system is that, among other things, the cooling system can be selectively upgraded through the addition of supplemental cooling modules rather than replaced in its entirety when additional cooling capacity is required.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
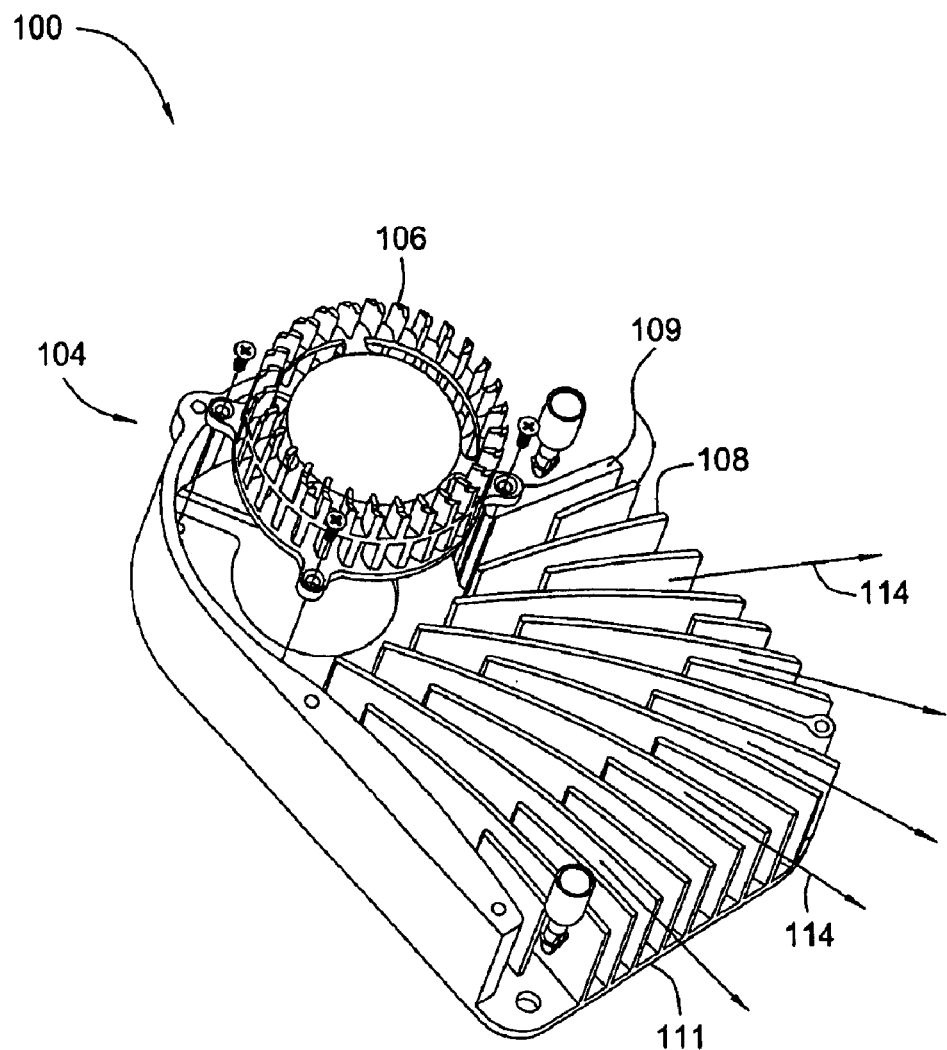
FIG. 1 is an isometric view illustrating a prior art system used to cool a processor.
Figure 2:
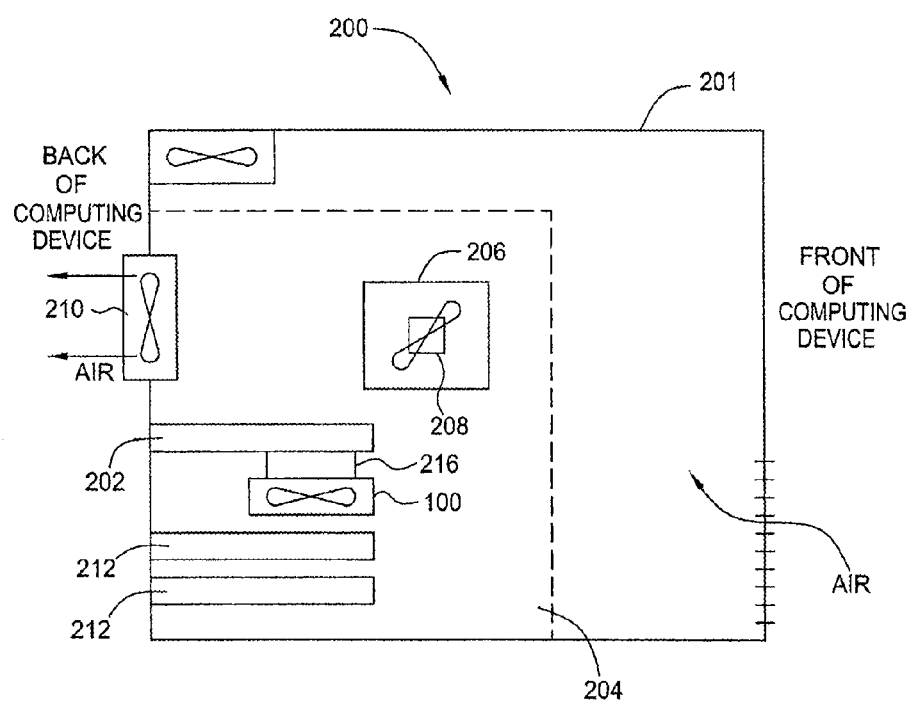
FIG. 2 is schematic diagram illustrating a computing system adapted for use with the prior art cooling system of FIG. 1.

FIG. 2 is schematic diagram illustrating a computing system 200 adapted for use with the prior art cooling system 100 of FIG. 1. Computing system 200 may be any type of computing system, including, without limitation, a desktop computer, a server, a laptop computer, a palm-sized computer, a personal digital assistant (PDA), a tablet computer, a gaming console, a cellular telephone, a computer-based simulator and the like.

As shown, computing system 200 includes a housing 201, within which a motherboard 204 resides. Mounted on motherboard 204 are a central processing unit (CPU) 206, a processor cooler 208 for cooling CPU 206, a system fan 210 for removing heat from computing system 200, and one or more peripheral component interface (PCI) cards 212, each interfaced with a slot located in the back part of housing 201. Motherboard 204 further incorporates a graphics card 202 that enables computing system 200 to rapidly process graphics related data for graphics intensive applications, such as gaming applications. Graphics card 202 comprises a printed circuit board (PCB) upon which a plurality of circuit components (not shown), such as memory chips and the like, are mounted. In addition, graphics card 200 includes a graphics processing unit (GPU) 216, mounted to one face of graphics card 202, for processing graphics related data. Generally, cooling system 100 is configured for coupling to GPU 216 as previously described.

Figure 3:
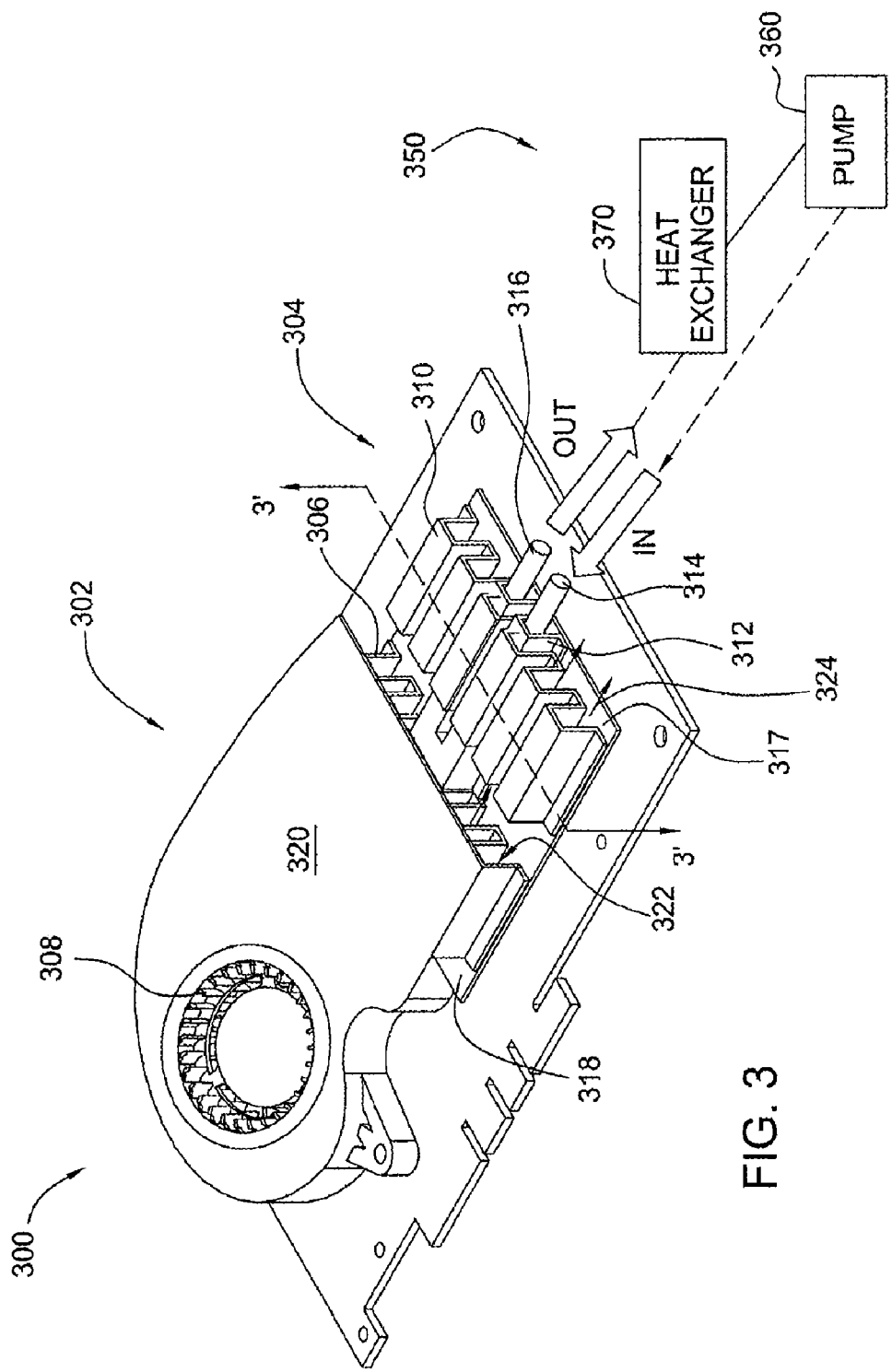
FIG. 3 is an isometric view illustrating a modular, scalable cooling system according to one embodiment of the present invention.

FIG. 3 is an isometric view illustrating a modular, scalable cooling system 300, according to one embodiment of the present invention. As shown, cooling system 300 may include, without limitation, a core cooling module 302, a first interface 304 and a supplemental cooling module 350. As described in further detail below, core cooling module 302 may operate independently or in combination with one or more supplemental cooling modules to dissipate heat generated by any type of electronic device within a computing system.

In one embodiment, core cooling module 302 is configured in a manner similar to cooling system 100 of FIG. 1 and includes, without limitation, a fan 308, walls 306 and a bottom plate 318. In one embodiment, core cooling module 302 also includes a lid 320, which, among other things, prevents particles and other contaminants from entering fan 308 and air blown from fan 308 from escaping cooling system 300. Lid 320, together with walls 306 and bottom plate 318 of core module 302, define a plurality of air channels 322.

First interface 304 is attached to the core cooling module 302 and is adapted to couple supplemental cooling module 350 to core cooling module 302 in order to increase the overall cooling capacity of cooling system 300. In one embodiment, first interface 304 is thermally coupled to a portion of bottom plate 318 of core cooling module 302 and includes, without limitation, a bottom plate 317, a fluid channel 312, an inlet 314, an outlet 316 and a plurality of air channels 310.

Air channels 310 are adapted for coupling to air channels 322 and for transporting forced air from fan 308. In one embodiment, air channels 310 are positioned over and around fluid channel 312, so that fluid channel 312 is substantially enclosed within air channels 310. In alternative embodiments, fluid channel 312 and air channels 310 may be positioned in any relative orientation that optimally dissipates heat produced by a heat-generating electronic device, such as GPU 216 of FIG. 2. Those skilled in the art will recognize that first interface 304 may be implemented to transfer heat via air channels 310, fluid channel 312, or both in combination.

In one embodiment, supplemental cooling module 350 comprises an internal (i.e., internal to the computing system in which the heat-generating device is implemented) liquid pump 360, which is adapted for circulating a heat transfer fluid (e.g., water or any other suitable heat conducting fluid) to and from core cooling module 302. Further, pump 360 may be configured to circulate fluid (e.g., via fluid lines, not shown) from first interface 304, through a heat exchanger 370, prior to supplying the fluid back to first interface 304. Inlet 314 and outlet 316 of first interface 304 are configured for respectively supplying and removing the heat transfer fluid from supplemental cooling module 350 to fluid channel 312.

Operating alone, core cooling module 302 dissipates heat in a manner similar to cooling system 100 illustrated in FIG. 1. Fan 308 is configured to force air through air channels 322 of core cooling module 302 and air channels 310 of first interface 304 such that heat generated by the heat-generating electronic device is transferred to the forced air as it passes over bottom plates 317 and 318. The forced air then exits cooling system 300, as depicted by flow lines 324, thereby dissipating the heat generated by the heat-generating device into the external environment.

As previously mentioned, the cooling capacity of cooling system 300 may be enhanced by interfacing supplemental cooling module 350 to core cooling module 302 via first interface 304. Supplemental cooling module 350 circulates heat transfer fluid through fluid channel 312 of first interface 304, and heat generated by the heat-generating electronic device transfers to the heat transfer fluid (as well as to air in air channels 310). In one embodiment, fluid channel 312 is adapted for transporting heat transfer fluid through downstream heat exchanger 370, which dissipates heat from the heat transfer fluid into an outside environment before supplemental cooling module 350 circulates the heat transfer fluid beck to first interface 304.

As set forth above, when greater cooling capacity is required of cooling system 300 (e.g., due to increased heat generation by the heat-generating device), cooling system 300 may be enabled to dissipate a greater amount of heat by selectively interfacing supplemental cooling module 350 to core cooling module 302 via first interface 304. Users may thereby build upon a basic cooling system (e.g., core cooling module 302) when additional cooling is required without having to replace the entire existing cooling system. In this fashion, cooling system 300 is both modular and scalable.

Persons skilled in the art will recognize that cooling system 300, including core cooling module 302, first interface 302 and supplemental cooling module 350, may be used to cool any type of heat-generating device. For example, in one embodiment, the heat-generating device comprises a graphics processing unit. In an alternative embodiment, the heat-generating device may comprise a central processing unit. In yet another alternative embodiment, the heat-generating device may comprise an application-specific integrated circuit (ASIC). In another embodiment, cooling system 300 may be sized to simultaneously cool a plurality of heat-generating devices, such as one or more memory chips and a processor.

Figure 4:
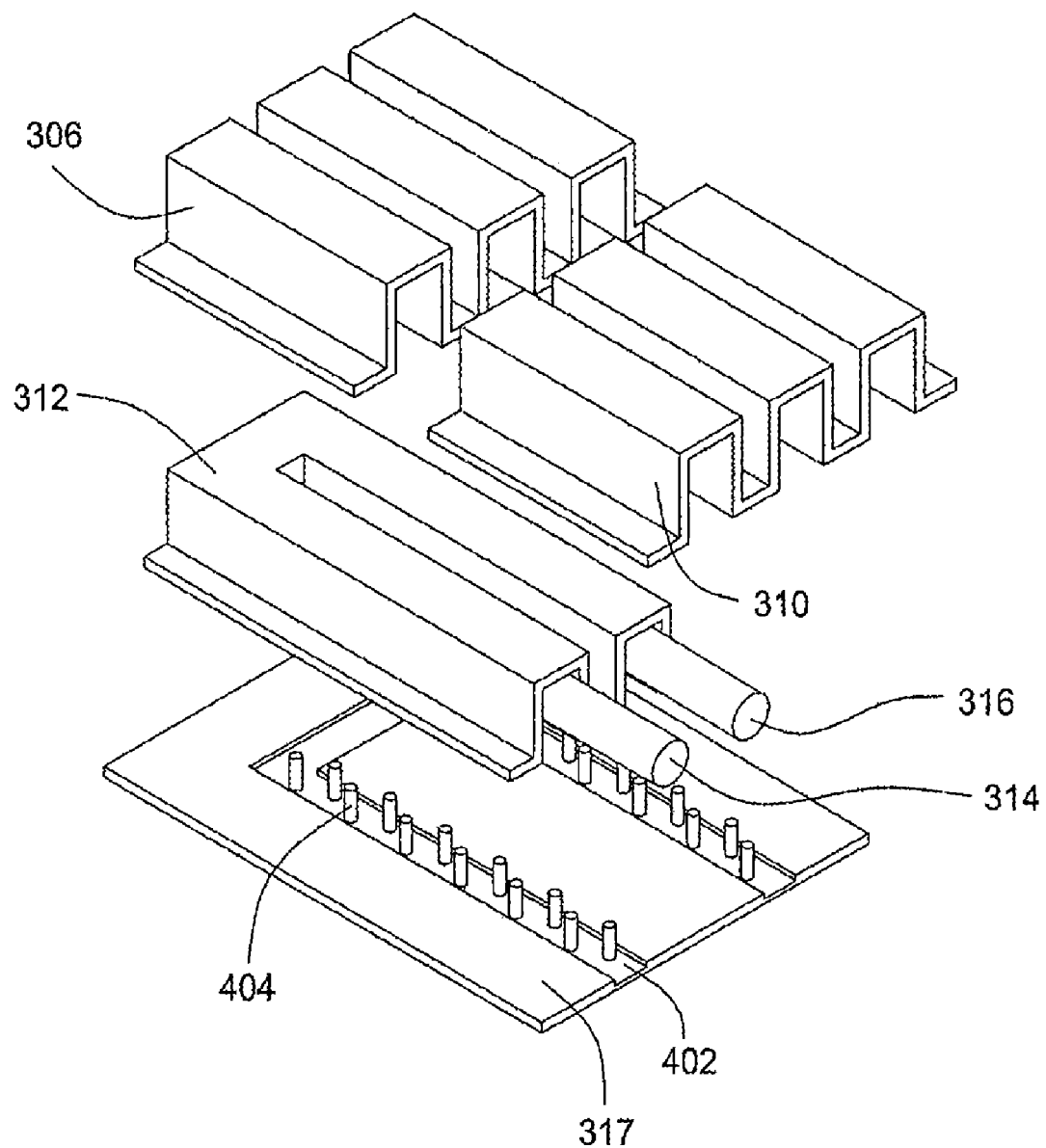
FIG. 4 is an exploded view of a portion of the modular, scalable cooling system illustrated in FIG. 3.

FIG. 4 is an exploded view of a portion of cooling system 300. In one embodiment, bottom plate 317 of first interface 304 includes a trench 402 sized for coupling to and sealing fluid channels 312. In one embodiment, the surface of trench 402 is textured to increase the heat transfer surface area of bottom plate 317, as described in further detail below, and to transfer heat from bottom plate 317 to the heat transfer fluid flowing through fluid channel 312. For example, trench 402 may further include a plurality of pins 404 extending upward from bottom plate 317. The density and geometric shape of pins 404 may vary, so long as pins 404 are capable of effectively transferring heat from bottom plate 317 to the heat transfer fluid flowing around pins 404.

Figure 5:
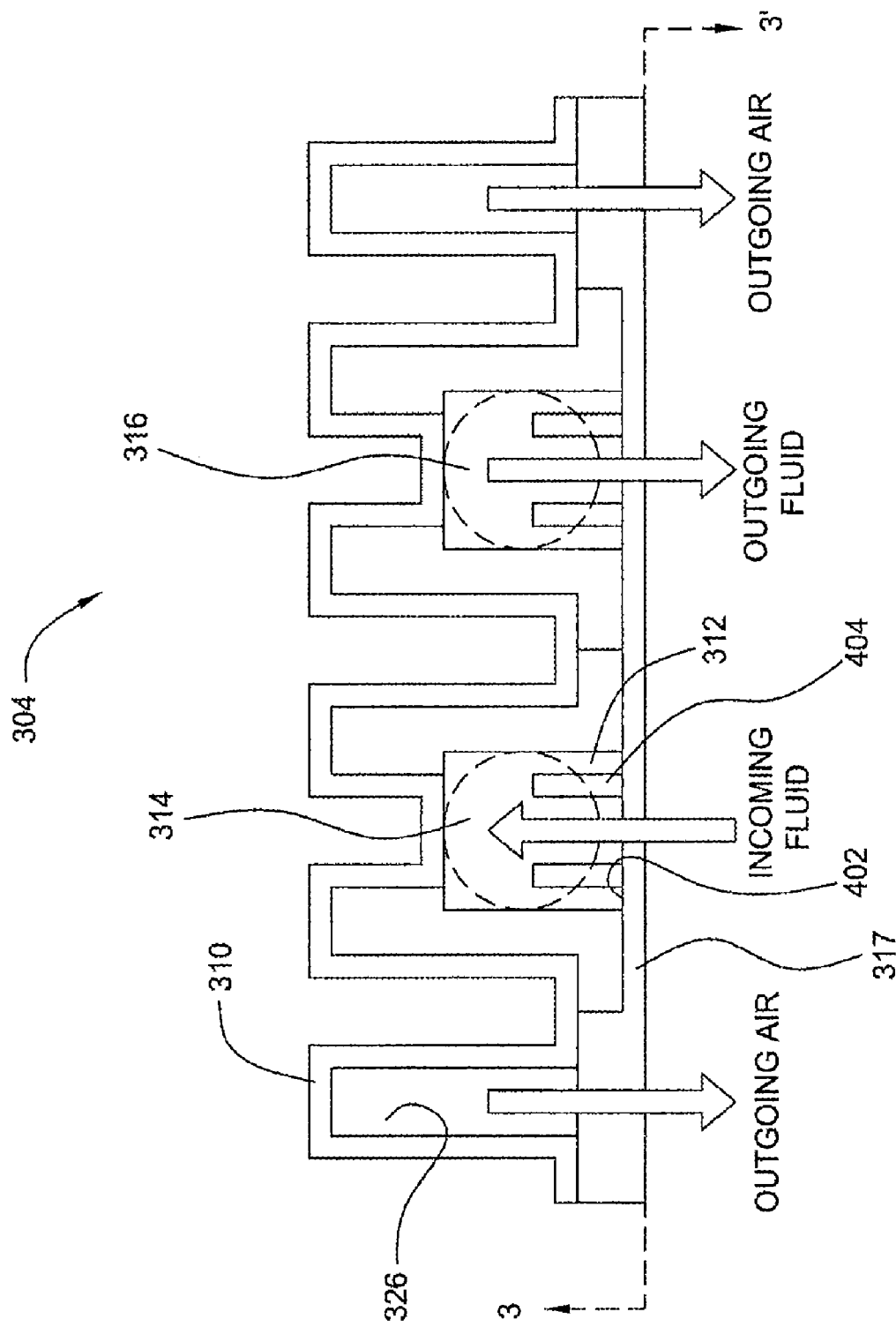
FIG. 5 is a cross sectional view of a portion of the modular, scalable cooling system illustrated in FIG. 3.

FIG. 5 is a cross sectional view of first interface 304, taken along sectional line 3-3' of FIG. 3. As illustrated, first interface 304 is configured to couple core cooling module 302 to supplemental module 350 (and to dissipate heat from a heat-generating device) via fluid channel 312 and/or air channels 310. As described above, air channels 310 may be configured to interface to air channels 322 of core cooling module 302, so that even when the pump 360 of supplemental cooling module 350 is not activated to circulate fluid through fluid channel 312, air channels 310 will operate to increase the heat transfer surface area of cooling system 300 (e.g., by effectively extending air channels 322), thereby enabling heat to be dissipated more efficiently.

Figure 6:
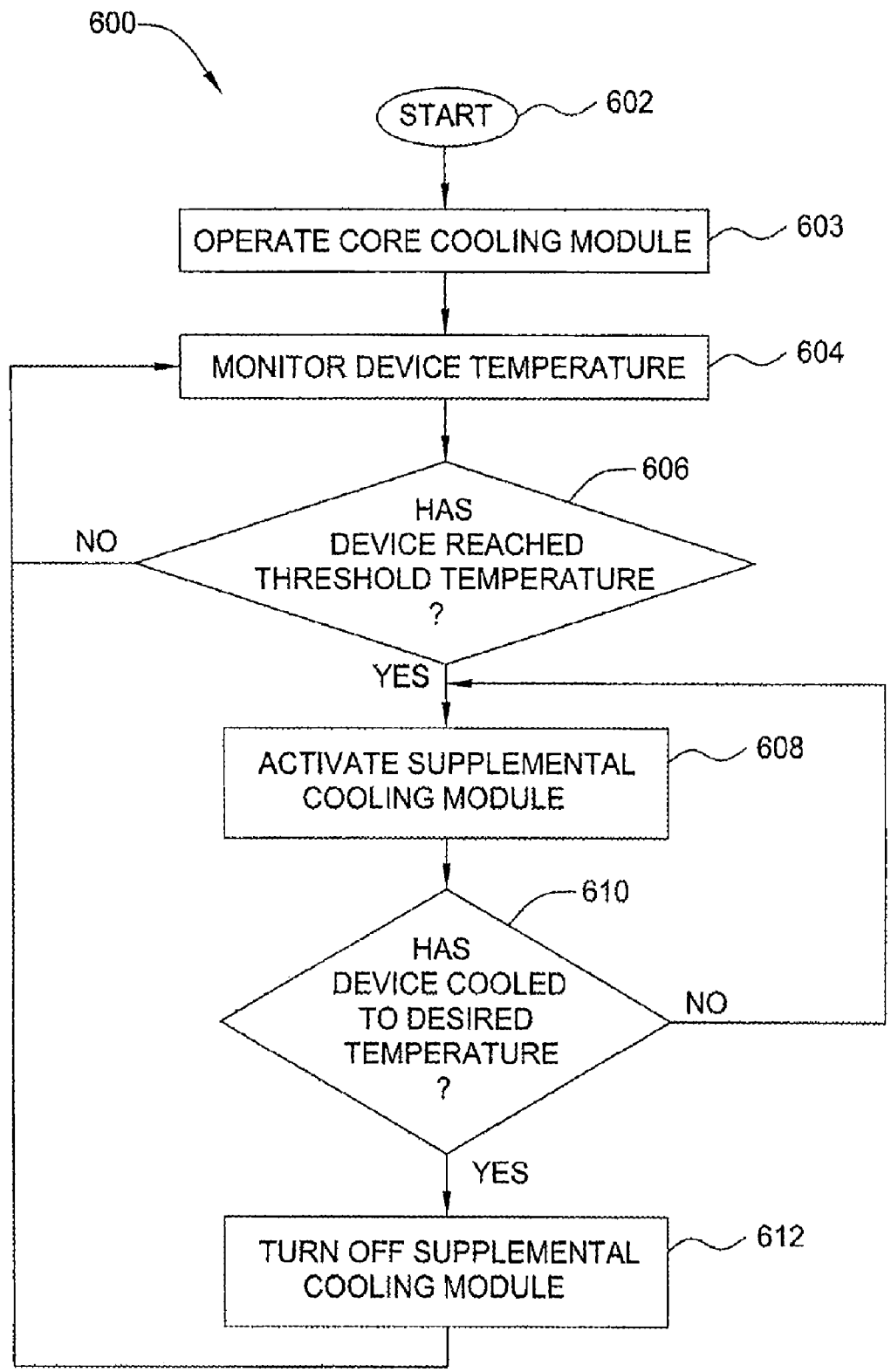
FIG. 6 is a flow diagram illustrating a method for controlling the modular, scalable cooling system illustrated in FIG. 3, according to one embodiment of the invention

FIG. 6 is a flow diagram illustrating a method 600 for controlling cooling system 300, for example for implementation by a control unit coupled to cooling system 300, according to one embodiment of the invention. In the illustrated embodiment, core cooling module 302 is the primary means for heat dissipation, while supplemental cooling module 350 is selectively engaged to increase the cooling capacity of cooling system 300 when increased heat dissipation is required. Method 600 is initialized at step 602, and in step 603, core cooling module 302 operates to cool a heat-generating device. In step 604 the temperature of the heat-generating device is monitored, for example by means of a thermal diode or other sensor positioned proximate to the device. In step 606, the control unit determines whether the temperature of the heat-generating device has reached a predetermined threshold temperature at which supplemental cooling module 350 should be engaged.

If the temperature of the heat-generating device has not reached the threshold temperature, the method 600 returns to step 604 and the monitoring device continues to monitor the temperature of the heat-generating device. Alternatively, if the threshold temperature has been reached or exceeded, the method 600 proceeds to step 608, where supplemental cooling module 350 is activated, in order to engage the secondary heat dissipation mechanism and increase the cooling capacity of cooling system 300. In step 610, the control unit determines whether the implementation of supplemental cooling module 650 has cooled the device to a predetermined desired temperature (e.g., an ideal operating temperature).

If the device has been cooled to the desired temperature, method 600 proceeds to step 612, and the control unit turns off supplemental cooling module 650 (e.g., turns off the pump where supplemental cooling module 350 is a fluid-based cooling component) so that the heat-generating device continues to be cooled by the primary heat dissipation mechanism (e.g., core cooling module 302). Method 600 then returns to step 604, where the monitoring device continues to monitor the temperature of the heat-generating device. Alternatively, if the heat-generating device has not yet been cooled to the desired temperature, method 600 returns to step 608, and supplemental cooling module 350 continues to operate (e.g., continues to run the pump) until the heat-generating device is cooled to the desired temperature.

Cooling system 300 thus offers a significant advantage over conventional cooling systems, such as cooling system 100 of FIG. 1. Specifically, providing core cooling module 302 with attachment to first interface 304 enables a user to selectively upgrade cooling system 300, e.g., by interfacing supplemental cooling module 350 to core cooling module 302 in order to provide additional cooling capacity. This additional cooling capacity can be implemented on a limited or as-needed basis. Users are thereby enabled to build upon a basic cooling system (e.g., core cooling module 302) when additional cooling is required and thus do not need to replace the entire existing cooling system.

In the context of graphics processors, the locations and sizes of the components of cooling system 300, namely, core cooling module 302, first interface 304 and supplemental cooling module 350, may be dictated by other board-mounted components as well as by accelerated graphics processor (AGP)-specified envelope constraints. Moreover, those skilled in the art will appreciate that the cooling system described herein may be implemented in both ATX motherboard configurations (wherein a graphics card is orientated so that the GPU faces downward relative to the computing system, as illustrated in FIG. 2) and BTX configurations (wherein a graphics card is orientated so that the GPU faces upward relative to the computing system).

Figure 7:
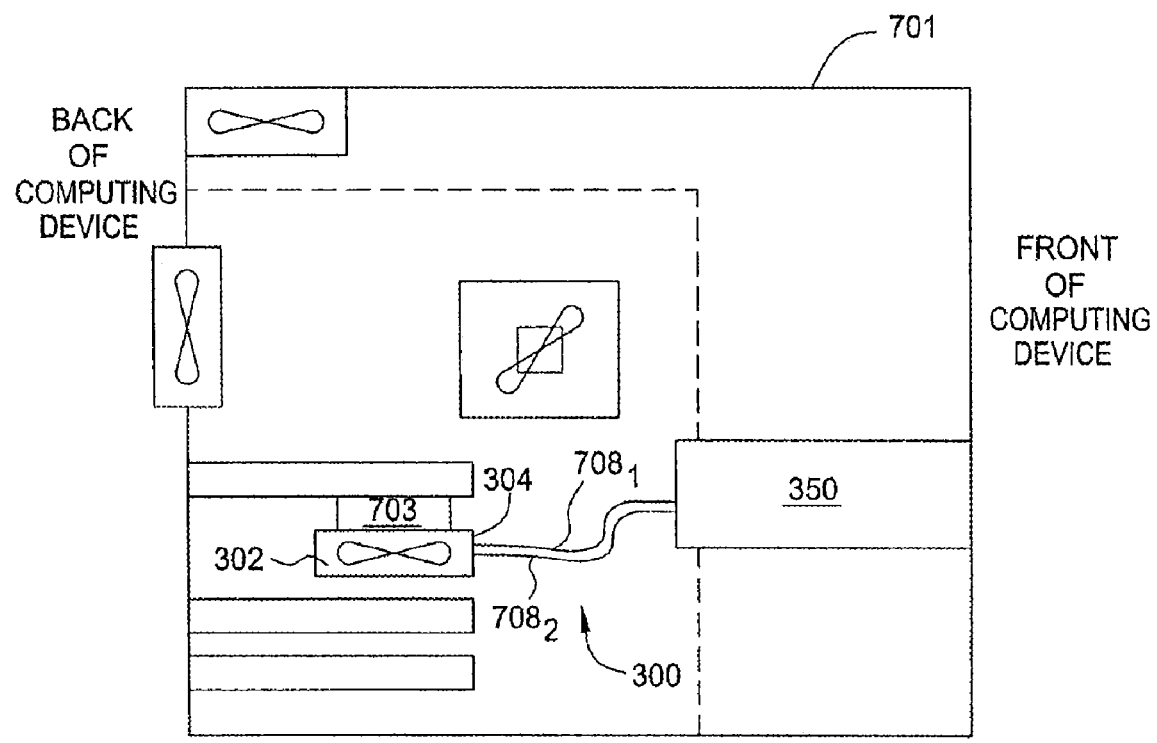
FIG. 7 is schematic diagram illustrating a computing system adapted for use with the modular, scalable cooling system of FIG. 3, according to one embodiment of the present invention.

FIG. 7 is schematic diagram illustrating a computing system 701 adapted for use with the modular, scalable cooling system 300 of FIG. 3, according to one embodiment of the present invention. Although implementations of cooling system 300 are described within the exemplary context of computing system 701, those skilled in the art will appreciate that cooling system 300 may be adapted to cool any type of heat-generating electronic device that requires heat dissipation.

In the embodiment illustrated, cooling system 300 is configured for coupling to a GPU 703 in lieu of a conventional cooling system, such as cooling system 100 of FIG. 1. As described above with reference to FIG. 3, cooling system 300 includes, without limitation, core cooling module 302, supplemental cooling module 350 and first interface 304. As described above, core cooling module 302 may operate independently or in combination with one or more supplemental cooling modules to dissipate heat from GPU 703.

As shown, core cooling module 302 is thermally coupled to GPU 703. Core cooling module 302 is further coupled, via first interface 304, to supplemental cooling module 350, which is disposed in a location remote from GPU 703 but internal to computing system 701. Supplemental cooling module 350 comprises a liquid pump, which is adapted for circulating, via first and second fluid lines $708_1$ and $708_2$, a heat transfer fluid to and from core cooling module 302. First fluid line $708_1$ is coupled to a first end of a fluid channel of first interface 304 and is adapted to transport a heat transfer fluid from supplemental cooling module 350 to the fluid channel. Second fluid line $708_2$ is coupled to a second end of the fluid channel and is adapted to transport a heat transfer fluid from the fluid channel to supplemental cooling module 350.

In one embodiment, cooling system 300 operates in accordance with the method 600 illustrated in FIG. 6. For example, core cooling module 302 and supplemental cooling module 350 may be implemented independently or in combination to dissipate heat from GPU 703 in the most efficient manner. Importantly, as previously described, supplemental cooling module 350 may be used to increase the cooling capacity of cooling system 300 on an as-needed basis.

Figure 8:
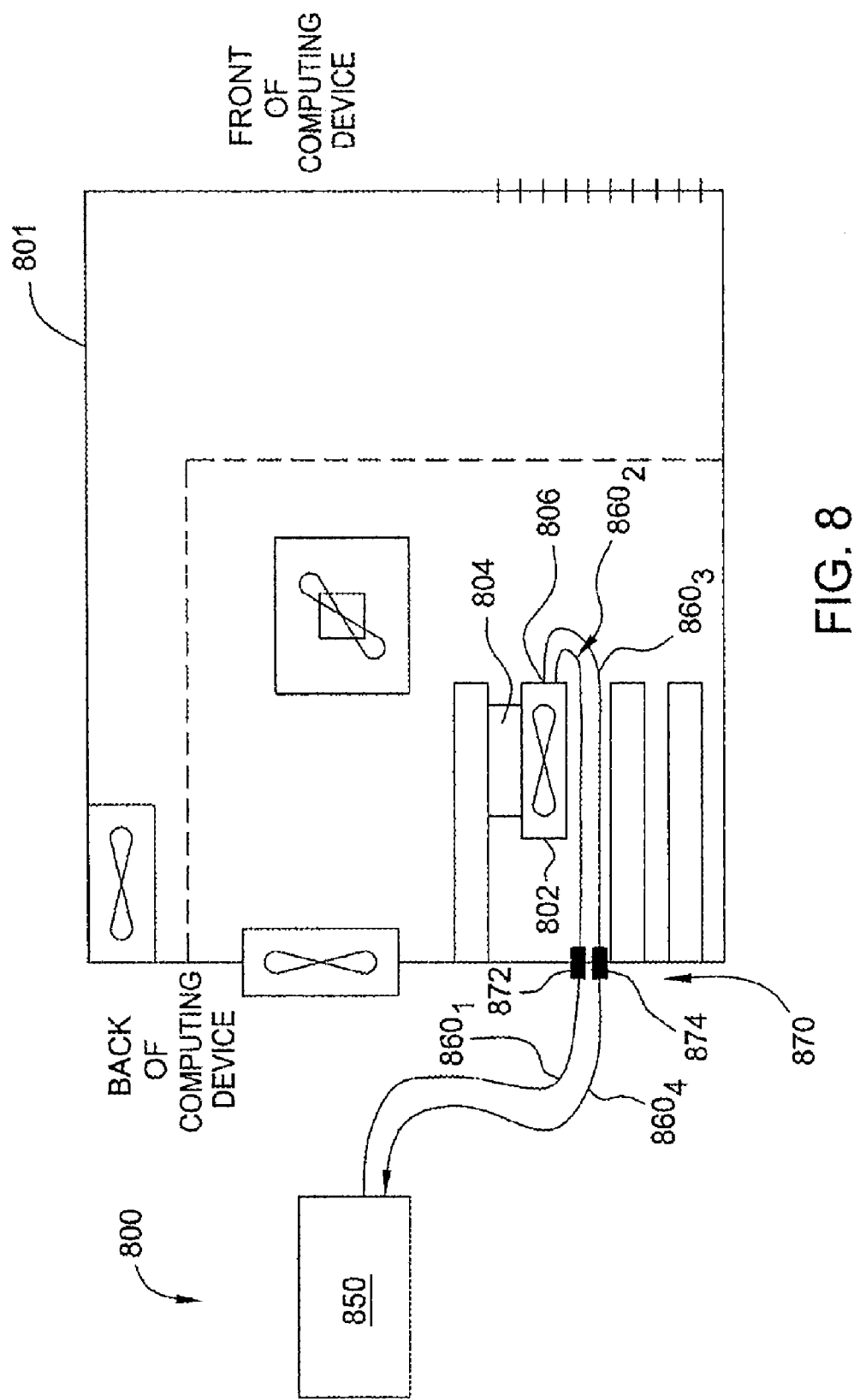
FIG. 8 is schematic diagram illustrating a computing system adapted for use with a modular, scalable cooling system, according to a second embodiment of the present invention.

FIG. 8 is schematic diagram illustrating a computing system 801 adapted for use with a modular, scalable cooling system 800, according to a second embodiment of the present invention. Although implementations of cooling system 800 are described within the exemplary context of computing system 801, those skilled in the art will appreciate that cooling system 800 may be adapted to cool any type of heat-generating electronic device that requires heat dissipation.

In the embodiment illustrated, cooling system 800 is configured for coupling to a GPU 804 in lieu of a conventional cooling system, such as cooling system 100 of FIG. 1. Cooling system 800 may include, without limitation, a core cooling module 802, a supplemental cooling module 850, a first interface 806 and a second interface 870. As described above, core cooling module 802 may operate independently or in combination with one or more supplemental cooling modules to dissipate heat from GPU 804.

As shown, core cooling module 802 is thermally coupled to GPU 804. Core cooling module 802 is configured in a manner substantially similar to core cooling module 302 of FIG. 3 and includes, without limitation, a fan, walls, a bottom plate and a lid that collectively define a plurality of air channels (not shown).

Core cooling module 802 is further coupled, via first interface 806, to supplemental cooling module 850, which again is disposed in a location remote from GPU 806. In this embodiment, however, supplemental cooling module 850 comprises an external (e.g., external to a computing system 801) liquid pump, which is adapted for circulating, via first, second, third and fourth fluid lines $860_1$, $860_2$, $860_3$ and $860_4$, a heat transfer fluid to and from core cooling module 802.

Second interface 870 couples supplemental cooling module 850 to computing system 801. In one embodiment, second interface 870 is a standardized dual fluid connector bracket fluid interface comprising a first connector 872 for interfacing a fluid supply line and a second connector 874 for interfacing a fluid removal line. More specifically, a first fluid line $860_1$ couples supplemental cooling module 850 to first connector 872 and is adapted to transport heat transfer fluid from supplemental cooling module 850 to first interface 806. Second fluid line $860_2$ couples first connector 872 to a fluid channel of first interface 806 and also is adapted to transport a heat transfer fluid from supplemental cooling module 850 to first interface 806. Third fluid line $860_3$ couples the fluid channel to second connector 874 transports heat transfer fluid from first interface 806 back to supplemental cooling module 850. Fourth fluid line $860_4$ couples second connector 874 to supplemental cooling module 850 and also is adapted to transport a heat transfer fluid from first interface 806 back to supplemental cooling module 850.

An external liquid pump, as embodied in supplemental cooling module 850, may be used where computing system 801 does not have an internal liquid pump, or where computing system 801 does not have room to install an internal liquid pump. In one embodiment, supplemental cooling module 850 comprises a liquid pump configured for circulating heat transfer fluid that is substantially at room temperature. In embodiments where more cooling is required, supplemental cooling module 850 comprises a refrigerated liquid system that is configured to circulate chilled heat transfer fluid to and from core cooling module 802.

Thus, first and second interfaces 806 and 870 enable an external supplemental cooling module 850 to be coupled to core cooling module 802 in order to enhance the cooling capacity of cooling system 800. In this fashion, cooling system 800 is both modular and scalable. Further, in one embodiment, cooling system 800 may be controlled in a manner similar to cooling system 300, in accordance with the method 600 illustrated in FIG. 6.

Figure 9A:
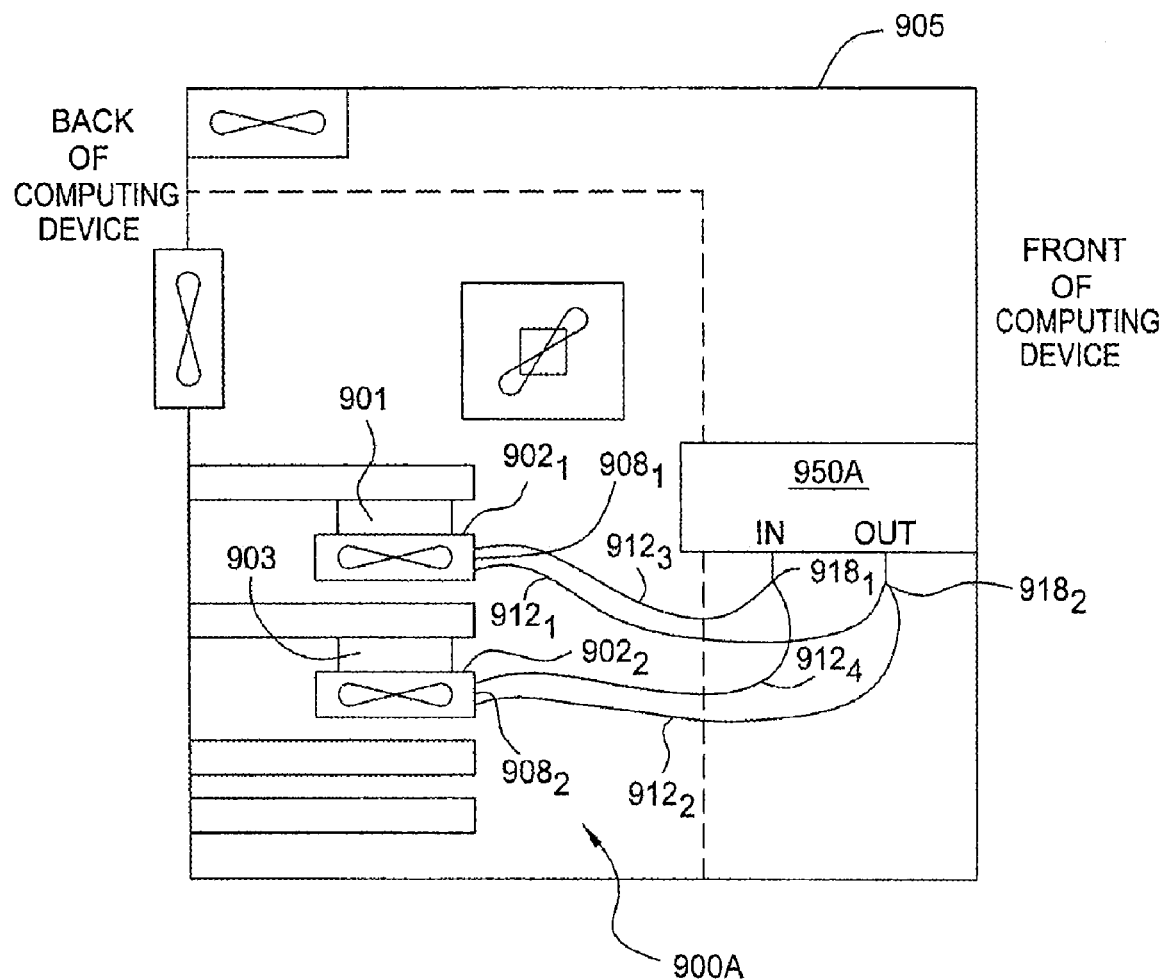
FIG. 9A is schematic diagram illustrating a computing system adapted for use with a modular, scalable cooling system, according to a third embodiment of the present invention.

FIG. 9A is schematic diagram illustrating computing system 905 adapted for use with a modular, scalable cooling system 900A, according to a third embodiment of the present invention. Specifically, cooling system 900A is adapted for simultaneously cooling two or more heat-generating electronic devices (e.g., graphics processors 901 and 903) implemented within computing system 905.

In one embodiment, cooling system 900A includes two or more core cooling modules $902_1$ and $902_2$ (hereinafter collectively referred to as "core cooling modules 902"), where one of core cooling modules 902 is thermally coupled to one of the heat-generating electronic devices. In addition, cooling system 900A includes, without limitation, an internal supplemental cooling module 950A, configured in a manner substantially similar to supplemental cooling module 350 of FIG. 3, and two or more first interfaces $908_1$ and $908_2$ (hereinafter collectively referred to as "first interfaces 908"), where one of first interfaces 908 is attached to one of core cooling modules 902. Further, each one of first interfaces 908 is configured in a manner substantially similar to first interface 304 of FIG. 3 and is coupled to supplemental cooling module 950A and to one of core cooling modules 902.

In one embodiment, both the incoming and outgoing fluid ports of supplemental cooling module 950A include Y-splitters $918_1$ and $918_2$ (hereinafter collectively referred to as "Y-splitters 918") adapted for splitting incoming and outgoing fluid streams into two or more streams for circulating heat transfer fluid to and from core cooling modules 902.

As shown, Y-splitter $918_2$ divides an outgoing fluid stream into a first fluid line $912_1$ and a second fluid line $912_2$. First fluid line $912_1$ couples supplemental cooling module 950A to a fluid channel of first interface $908_1$ and is adapted to transport heat transfer fluid from supplemental cooling module 950A to the fluid channel. Second fluid line $912_2$ couples supplemental cooling module 950A to a fluid channel of first interface $908_2$ and is adapted to transport heat transfer fluid from supplemental cooling module 950A to the fluid channel. A third fluid line $912_3$ couples the fluid channel of first interface $908_1$ to supplemental cooling module 950A and transports heat transfer fluid from the fluid channel back to supplemental cooling module 950A. A fourth fluid line $912_4$ couples the fluid channel of first interface $908_2$ to supplemental cooling module 950A and transports heat transfer fluid from the fluid channel back to supplemental cooling module 950A. Third and fourth fluid lines $912_3$ and $912_4$ merge at Y-splitter $918_1$ at the incoming port of supplemental cooling module 950A.

Supplemental cooling module 950A is disposed within computing system 905 and located remotely from graphics processors 901 and 903. In one embodiment, supplemental cooling module 950A comprises a liquid pump adapted for circulating a heat transfer fluid to and from core cooling modules 902 via fluid lines $912_1$-$912_4$. In one embodiment, cooling system 900A may operate in accordance with the method 600 illustrated in FIG. 6. For example, core cooling modules 902 and supplemental cooling module 950A may be implemented independently or in combination to dissipate heat from GPUs 901 and 903 in the most efficient manner. Similar to cooling system 300, the cooling capacity of cooling system 900A may be enhanced when necessary to address increased heat dissipation requirements of heat-generating electronic devices implemented within computing system 905.

Figure 9B:
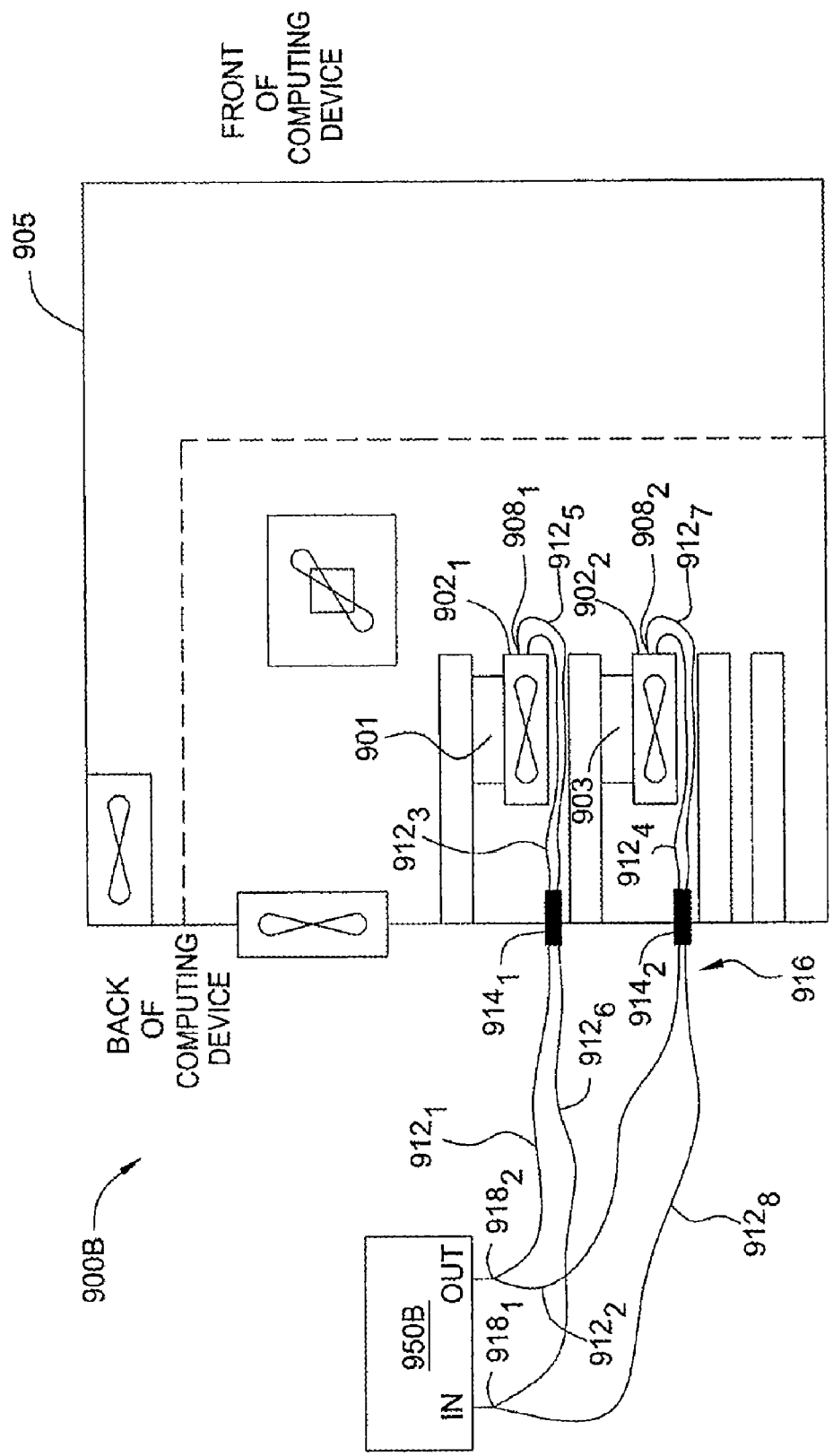
FIG. 9B is schematic diagram illustrating a computing system adapted for use with a modular, scalable cooling system, according to a fourth embodiment of the present invention.

FIG. 9B is schematic diagram illustrating a computing system 905 adapted for use with a modular, scalable cooling system 900B, according to a third embodiment of the present invention. Like FIG. 9A, FIG. 9B illustrates a cooling system 900B that is adapted for simultaneously cooling two or more heat-generating electronic devices (e.g., two graphics processors 901 and 903) deployed within computing system 905.

In one embodiment, cooling system 900B includes two or more core cooling modules $902_1$ and $902_2$ (hereinafter collectively referred to as "core cooling modules 902"), where one of core cooling modules 902 is thermally coupled to one of the heat-generating electronic devices. In addition, cooling system 900B includes, without limitation, an external supplemental cooling module 950B, configured in a manner substantially similar to supplemental cooling module 850 of FIG. 8, two or more first interfaces $908_1$ or $908_2$ (hereinafter collectively referred to as "first interfaces 908"), where one of first interfaces 908 is attached to one of core cooling modules 902, and two or more second interfaces $914_1$ and $914_2$ (hereinafter collectively referred to as "second interfaces 914"). Each one of first interfaces 908 is configured in a manner substantially similar to first interface 304 of FIG. 3 and is coupled to supplemental cooling module 950B and to one of core cooling modules 902, and each one of second interfaces 914 is configured in a manner substantially similar to second interface 870 of FIG. 8.

In one embodiment, both the incoming and outgoing fluid ports of supplemental cooling module 950B include Y-splitters $918_1$ and $918_2$ (hereinafter collectively referred to as "Y-splitters 918") adapted for splitting incoming and outgoing fluid streams into two or more streams for circulating heat transfer fluid to and from two or more core cooling modules 902. Although Y-splitters 918 are illustrated as being external to computing system 905, Y-splitters 918 may be disposed internally to computing system 905 in alternative embodiments.

As shown, Y-splitter $918_2$ divides an outgoing fluid stream into a first fluid line $912_1$ and a second fluid line $912_2$. First fluid line $912_1$ couples supplemental cooling module 950B to second interface $914_1$ and is adapted to transport heat transfer fluid from supplemental cooling module 950A to a fluid channel of first interface $908_1$ (via second interface $914_1$). Second fluid line $912_2$ couples supplemental cooling module 950B to second interface $914_2$ and is adapted to transport heat transfer fluid from supplemental cooling module 950B to a fluid channel of first interface $908_2$ (via second interface $914_2$). A third fluid line $912_3$ couples second interface $914_1$ to a fluid channel of first interface $908_1$, and a fourth fluid line $912_4$ couples second interface $914_2$ to a fluid channel of first interface $908_2$. A fifth fluid line $912_5$ couples the fluid channel of first interface $908_1$ to second interface $914_1$ and transports heat transfer fluid from the fluid channel back to supplemental cooling module 950B (via second interface $914_1$). A sixth fluid line $912_6$ couples second interface $914_1$ to supplemental cooling module 950B. A seventh fluid line $912_7$ couples the fluid channel of first interface $908_2$ to second interface $914_2$ and transports heat transfer fluid from the fluid channel back to supplemental cooling module 950B (via second interface $914_2$). An eighth fluid line $912_8$ couples second interface $914_2$ to supplemental cooling module 950B. Sixth and eighth fluid lines $912_6$ and $912_8$ merge at Y-splitter $918_1$ at the incoming port of supplemental cooling module 950B.

Supplemental cooling module 950B is disposed externally to computing system 905 and located remotely from graphics processors 901 and 903. In one embodiment, supplemental cooling module 950B comprises a liquid pump adapted for circulating a heat transfer fluid to and from core cooling modules $902_1$ and $902_2$ via fluid lines $912_1$-$912_8$. Like supplemental cooling module 850, supplemental cooling module 950B may comprise a liquid pump configured for circulating heat transfer fluid that is substantially at room temperature. Alternatively, supplemental cooling module 950B may comprise a refrigerated liquid system that is configured to circulate chilled heat transfer fluid to and from core cooling modules 902. In one embodiment, cooling system 900B operates in accordance with the method 600 illustrated in FIG. 6. Core cooling modules $902_1$ and $902_2$ and supplemental cooling module 950B may be implemented independently or in combination to dissipate heat from GPUs 901 and 903 in the most efficient manner. Similar to cooling system 300, the cooling capacity of cooling system 900B may be enhanced when necessary to address increased heat dissipation requirements of heat-generating electronic devices implemented within computing system 905.

Thus, the present invention represents a significant advancement in the field of thermal solutions for computer hardware. A modular, scalable cooling system can be selectively upgraded by implementing a variety of supplemental cooling modules in addition to the basic core cooling module(s) of the cooling system. A user is thereby enabled to upgrade the cooling system on an as-needed basis, rather than replace the entire cooling system when additional cooling capacity is required.

While the foregoing is directed to embodiments of the present invention, other and further embodiments of the invention may be devised without departing from the basic scope thereof, and the scope thereof is determined by the claims that follow.

We claim:

1. A modular, scalable system for cooling heat-generating electronic devices, the system comprising:
   a first core cooling module configured to be thermally coupled to a first heat-generating electronic device to remove heat from the first heat-generating electronic device, the first core cooling module having at least one air channel;
   a second core cooling module configured to be thermally coupled to a second heat-generating electronic device to remove heat from the second heat-generating electronic device, the second core cooling module having at least one air channel;
   a supplemental cooling module configured to be thermally coupled to the first and second core cooling modules;
   a first interface having a plurality of air channels, the first interface being positioned adjacent to the first core cooling module such that the plurality of air channels of the first interface are thermally coupled to the at least one air channel of the first core cooling module, the first interface configured to thermally couple the first core cooling module to the supplemental cooling module; and
   a second interface having a plurality of air channels, the second interface being positioned adjacent to the second core cooling module such that the plurality of air channels of the second interface are thermally coupled to the at least one air channel of the core cooling module, the first interface is configured to thermally couple the second core cooling module to the supplemental cooling module.

2. The system of claim 1, wherein the first and second core cooling modules comprise fansinks.

3. The system of claim 1, wherein the supplemental cooling module includes a liquid pump disposed within a computing system in which the first and second heat-generating electronic devices are implemented and adapted for circulating a heat transfer liquid to and from the first and second core cooling modules.

4. The system of claim 1, wherein the first and second interfaces each include a fluid channel adjacent to one or more of the plurality of air channels and adapted to receive a heat transfer liquid from the supplemental cooling module and to return the heat transfer liquid to the supplemental cooling module.

5. The system of claim 4, further comprising first, second, third and fourth fluid lines, the first fluid line connected to a first end of the fluid channel of the first interface and adapted to transport the heat transfer liquid from the supplemental cooling module to the fluid channel of the first interface, the second fluid line connected to a second end of the fluid channel of the first interface and adapted to transport the heat transfer liquid from the fluid channel of the first interface to the supplemental cooling module, the third fluid line connected to a first end of the fluid channel of the second interface and adapted to transport the heat transfer liquid from the supplemental cooling module to the fluid channel of the second interface, the fourth fluid line connected to a second end of the fluid channel of the second interface and adapted to transport the heat transfer liquid from the fluid channel of the second interface to the supplemental cooling module, wherein the first and third fluid lines merge at an incoming port of the supplemental cooling module and the second and fourth fluid lines merge at an outgoing port of the supplemental cooling module.

6. The system of claim 1, further comprising:
a first splitter coupled to an outgoing fluid port of the supplemental cooling module and configured to simultaneously deliver a heat transfer fluid from the supplemental cooling module to the first and second core cooling modules; and
a second splitter coupled to an incoming fluid port of the supplemental cooling module and configured to simultaneously deliver the heat transfer fluid from the first and second core cooling modules to the supplemental cooling module.

7. The system of claim 1, further comprising a third interface attached to a housing of a computing system in which the first and second heat-generating electronic devices are implemented and configured to couple at least one of the first and second core cooling modules to the supplemental cooling module, wherein the supplemental cooling module is disposed externally to the computing system.

8. The system of claim 7, wherein the supplemental cooling module includes a liquid pump adapted for circulating a heat transfer liquid to and from the first and second core cooling modules.

9. The system of claim 7, wherein the supplemental cooling module includes a refrigerated liquid system adapted for circulating a chilled heat transfer liquid to and from the first and second core cooling modules.

10. The system of claim 1, wherein the first and second heat-generating electronic devices are graphics processing units.

11. The system of claim 4 wherein the air channels of the first and second interfaces are positioned over and around the fluid channel so that the fluid channel is substantially enclosed within the plurality of air channels.

12. The system of claim 1 wherein the interface is mounted on a plate that is thermally coupled to the core cooling module.

13. The system of claim 11 wherein the first interface includes a trench for coupling to and sealing the fluid channels of the first and second interfaces.

14. The system of claim 13 wherein a surface of the trench is textured to increase the heat transfer surface area of the plate of the interface.

15. The system of claim 13 further including a plurality of pins disposed in the trench, the plurality of pins configured to transfer heat from the plate of the interface to the fluid.

* * * * *